United States Patent
Lee et al.

(10) Patent No.: US 10,841,036 B2
(45) Date of Patent: Nov. 17, 2020

(54) SYSTEM AND METHOD FOR POLARIZATION MULTIPLEXED OPTICAL COMMUNICATIONS

(71) Applicant: NOKIA OF AMERICA CORPORATION, Murray Hill, NJ (US)

(72) Inventors: Jeffrey Lee, Summit, NJ (US); Po Dong, Morganville, NJ (US); Young-Kai Chen, Berkeley Heights, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 61 days.

(21) Appl. No.: 15/858,634

(22) Filed: Dec. 29, 2017

(65) Prior Publication Data

US 2018/0212709 A1    Jul. 26, 2018

Related U.S. Application Data

(60) Provisional application No. 62/440,545, filed on Dec. 30, 2016.

(51) Int. Cl.
| | |
|---|---|
| H04B 10/532 | (2013.01) |
| H04J 14/06 | (2006.01) |
| H04B 10/61 | (2013.01) |
| H04B 10/69 | (2013.01) |

(52) U.S. Cl.
CPC ........... *H04J 14/06* (2013.01); *H04B 10/532* (2013.01); *H04B 10/614* (2013.01); *H04B 10/6166* (2013.01); *H04B 10/69* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,008,958 A | * | 4/1991 | Cimini, Jr. ........... | H04B 10/532 398/204 |
| 8,731,409 B2 | | 5/2014 | Akiyama et al. | |
| 8,891,910 B2 | | 11/2014 | Dell'Orto et al. | |

(Continued)

OTHER PUBLICATIONS

Che et al., "Stokes Vector Direct Detection for Linear Complex Optical Channels." Journal of Lightwave Technology, vol. 33:3, pp. 678,684 (Feb. 2015).

(Continued)

*Primary Examiner* — Omar S Ismail
(74) *Attorney, Agent, or Firm* — Mendelsohn Dunleavy, P.C.; Yuri Gruzdkov

(57) ABSTRACT

A transmitter modulates a first polarization signal at a wavelength with a first data signal using intensity modulation. The transmitter modulates a second polarization signal at the same wavelength with a second data signal using intensity modulation. The transmitter combines the modulated, polarization signals and generates an output signal. A receiver includes a photodetector that receives the output signal and generates an electrical output signal including components of both modulated, polarization signals. A signal processing circuit implements correlation techniques or matching filters to recover the first and second data signal from the electrical output signal.

8 Claims, 9 Drawing Sheets

(56) References Cited

U.S. PATENT DOCUMENTS

| | | | |
|---|---|---|---|
| 9,100,139 B2* | 8/2015 | Schmidt | H04J 14/0258 |
| 9,166,728 B2 | 10/2015 | Djordjevic et al. | |
| 9,250,496 B1 | 2/2016 | Thaniyavarn | |
| 2001/0048556 A1* | 12/2001 | Ranalli | G02F 1/31 |
| | | | 359/484.06 |
| 2004/0120627 A1* | 6/2004 | Van Tuyl | H04B 10/299 |
| | | | 385/11 |
| 2004/0120628 A1* | 6/2004 | Tuyl | H04B 10/299 |
| | | | 385/11 |
| 2008/0159758 A1* | 7/2008 | Shpantzer | H04B 10/65 |
| | | | 398/214 |
| 2009/0016723 A1* | 1/2009 | Taniguchi | H04B 10/25758 |
| | | | 398/74 |
| 2010/0034537 A1* | 2/2010 | Zhang | H04B 10/5561 |
| | | | 398/65 |
| 2011/0170690 A1* | 7/2011 | Shpantzer | H04J 14/0227 |
| | | | 380/256 |
| 2012/0008950 A1* | 1/2012 | Jander | G02B 6/272 |
| | | | 398/65 |
| 2012/0082453 A1* | 4/2012 | Wu | H04L 1/007 |
| | | | 398/48 |
| 2012/0082459 A1* | 4/2012 | Wu | H04L 1/0007 |
| | | | 398/79 |
| 2012/0087657 A1* | 4/2012 | Jander | H04Q 11/0005 |
| | | | 398/48 |
| 2012/0093100 A1* | 4/2012 | Qin | H04B 7/0413 |
| | | | 370/329 |
| 2012/0134676 A1* | 5/2012 | Kikuchi | H04B 10/614 |
| | | | 398/65 |
| 2013/0148965 A1* | 6/2013 | Losio | H04J 14/06 |
| | | | 398/65 |
| 2013/0236172 A1* | 9/2013 | Suzuki | H04B 10/0795 |
| | | | 398/43 |
| 2015/0030330 A1* | 1/2015 | Ogasahara | H04B 10/548 |
| | | | 398/65 |
| 2015/0117872 A1* | 4/2015 | Lyubomirsky | H04J 14/06 |
| | | | 398/205 |
| 2015/0132013 A1 | 5/2015 | Vermeulen | |
| 2016/0164599 A1* | 6/2016 | Heismann | H04B 10/07955 |
| | | | 398/26 |

OTHER PUBLICATIONS

Fyath, R. S., et al. "Optical receivers based on multistage laser preamplifiers." Ninth Annual International Phoenix Conference on Computers and Communications. 1990 Conference Proceedings. IEEE, 1990. (p. 230).

Erkilinç, M. Sezer, et al., "Polarization-insensitive single-balanced photodiode coherent receiver for long-reach WDM-PONs." Journal of Lightwave Technology 34.8 (2016): 2034-2041.

* cited by examiner

SYSTEM AND METHOD FOR POLARIZATION MULTIPLEXED OPTICAL COMMUNICATIONS

TECHNICAL FIELD

This application relates generally to polarization multiplexed optical communication systems and methods, and more particularly to polarization-division multiplexed (PDM), intensity-modulated optical communication systems and methods.

DESCRIPTION OF RELATED ART

This section introduces aspects that may be helpful to facilitating a better understanding of embodiments herein. Accordingly, the statements of this section are to be read in this light and are not to be understood as admissions about what is in the prior art or what is not in the prior art.

For implementing an ultra-high speed optical communication system, polarization division multiplexing (PDM) technology has attracted considerable interest. An electromagnetic wave such as light consists of a coupled oscillating electric field and magnetic field which are always perpendicular. By convention, the "polarization" state of electromagnetic waves refers to the direction of the electric field. Polarized light may be produced, e.g., by passing unpolarized light through a polarizing filter, which allows waves of only one polarization state to pass through. In PDM, at least two optical signals at a same wavelength are generated with polarization states that are orthogonal to each other.

The polarized signals are independently modulated with different data signals. The two modulated, polarized signals are then multiplexed and transmitted in a single wavelength channel through an optical fiber. By using two polarization states, two independent data signals may be transmitted using one wavelength channel.

However, the use of polarization division multiplexing is problematic because of mixing of polarization states within the optical fiber. The polarization states of polarization-multiplexed signals receive effects such as bending, birefringence, and oscillation of the optical fiber. Due to these effects, polarization mixing may occur and cause uncertainty and temporal variation of polarization states. Thus, the polarization states may be difficult to recover at the receiver.

One method for detecting polarization states is known as Stokes Vector detection and is described in, "Stokes Vector Direct Detection for Linear Complex Optical Channels," Di Che; An Li; Xi Chen; Qian Hu; Yifei Wang; Shieh, W., Journal of Lightwave Technology, Vol. 33, No. 3, pp. 678,684, February 2015. Stokes Vector detection involves detecting a third dimension, which includes information about the relative optical phase difference of two detected polarized signals so that polarization de-multiplexing can occur. However, instead of using only two photodetectors, one for each polarized signal, three photodetectors need to be used to implement the Stoke Vector detection method. The third photodetector is needed to detect the third dimension and obtain the additional information regarding the relative phase difference between the two polarized signals.

Therefore, a need exists to provide an improved system and method of polarization multiplexing and de-multiplexing in polarization-division multiplexed (PDM) optical communication systems and methods.

SUMMARY

Disclosed herein are various embodiments of apparatus and methods that may be beneficially applied to, e.g., polarization division multiplexing (PDM), in optical communications applications. While such embodiments may be expected to provide improvements in performance and/or reduction of cost of such apparatus and methods relative to conventional implementations, no particular result is a requirement of the present invention unless explicitly recited in a particular claim.

In an embodiment, a transmitter includes a polarization modulator configured to generate a first modulated optical signal $s_1(t)$ using intensity modulation having a first polarization state at a wavelength and generate a second modulated optical signal $s_2(t)$ using intensity modulation having a second polarization state at the same wavelength. The transmitter also includes a polarization combiner configured to combine the first modulated optical signal $s_1(t)$ and the second modulated optical signal $s_2(t)$, such that when combined, the first polarization state of the first modulated optical signal $s_1(t)$ is orthogonal to the second polarization state of the second modulated optical signal $s_2(t)$.

In the embodiment of the transmitter, the polarization modulator is configured to generate the first modulated polarized signal $s_1(t)$ by modulating a first base signal $\varphi_1(t)$ with a first data signal $d_1$ using intensity modulation. The polarization modulator is further configured to generate the second modulated polarized signal $s_2(t)$ by modulating a second base signal $\varphi_2(t)$ with a second data signal $d_2$ using intensity modulation.

In the embodiment of the transmitter, when combined, the first polarization state of the polarized optical signal $s_1(t)$ and the second polarization state of the polarized optical signal $s_2(t)$ have orthogonal geometrical orientations of oscillations of transverse waves at the same wavelength and the first polarized optical signal $s_1(t)$ has an indeterminate phase with respect to the second polarized signal $s_2(t)$.

In the embodiment of the transmitter, the polarization modulator comprises a first polarization circuit configured to modulate a first base signal $\varphi_1(t)$ with a first data signal $d_1$ using intensity modulation to generate the first modulated polarized optical signal $s_1(t)$ and a second polarization circuit configured to independently modulate a second base signal $\varphi_2(t)$ with a second data signal $d_2$ using intensity modulation to generate the second modulated polarized optical signal $s_2(t)$.

In the embodiment of the transmitter, the first polarization circuit comprises a first base signal modulation circuit configured to modulate a first optical input signal having a first polarization state at the same wavelength and a first intensity modulation circuit configured to modulate the first base signal $\varphi_1(t)$ with the first data signal $d_1$ using intensity modulation. The first polarization circuit further comprises a modulation signal generator configured to generate the first data signal $d_1$.

In the embodiment of the transmitter, the second polarization circuit comprises a second base signal modulation circuit configured to modulate a second optical input signal having a second polarization state at the same wavelength and a polarization rotator circuit configured to generate the second base signal having the second polarization state at the same wavelength. The second polarization circuit may also comprise a second intensity modulation circuit configured to modulate the second base signal $\varphi_2(t)$ with the second data signal $d_2$ using intensity modulation. The second polarization circuit further comprises a modulation signal generator configured to generate the second data signal $d_2$.

In an embodiment, a receiver includes a single photodetector configured to receive an optical input signal at a wavelength, wherein the optical input signal includes a first modulated polarized signal having a first polarization state combined with a second modulated polarized signal having a second polarization state. The single photodetector generates an electrical output signal, wherein the electrical output signal includes a component of the first modulated polarized signal and a component of the second modulated polarized signal. The receiver further includes a signal processing circuit configured to de-multiplex the electrical output signal to output the component of the first modulated polarized signal and the component of the second modulated polarized signal.

In the embodiment of the receiver, the first modulated polarized signal has a first polarization state and the second modulated polarized signal has a second polarization state at the same wavelength, wherein the second polarization state is orthogonal to the first polarization state.

In the embodiment of the receiver, the signal processing circuit includes a polarization de-multiplexing circuit configured to detect a first data signal modulated on the component of the first modulated polarized signal and a second data signal modulated on the component of the second modulated polarized signal.

In the embodiment of the receiver, the signal processing circuit includes a first correlation circuit configured to filter the electrical output signal using a first base signal to generate a first de-multiplexed signal, wherein the first base signal has the first polarization state at the same wavelength and obtain the first data signal from the first de-multiplexed signal.

In the embodiment of the receiver, the signal processing circuit includes a second correlation circuit configured to filter the electrical output signal using a second base signal to generate a second de-multiplexed signal, wherein the second base signal has the second polarization state at the same wavelength and obtain the second data signal from the second de-multiplexed signal.

In the embodiment of the receiver, the single photodetector is polarization insensitive such that the electrical output signal includes components from a plurality of polarization states of the optical input signal.

In another embodiment of a receiver, the receiver includes a photodetector circuit configured to detect an optical input signal at a wavelength using a single photodetector, wherein the optical input signal includes a first modulated polarized signal having a first polarization state and a second modulated polarized signal having a second polarization state, and wherein the first modulated polarized signal is intensity modulated with a first data signal and wherein the second modulated polarized signal is intensity modulated with a second data signal. The photodetector circuit generates generate an electrical output signal from the optical input signal. The receiver further includes a signal processing circuit configured to filter the electrical output signal using a first base signal to generate a first de-multiplexed signal and obtain the first data signal from the first de-multiplexed signal. The signal processing circuit is further configured to filter the electrical output signal using a second base signal to generate a second de-multiplexed signal and obtain the second data signal from the second de-multiplexed signal.

In another embodiment of the receiver, the signal processing circuit may include a first circuit configured to filter the first base signal from the electrical output signal using correlation techniques, and a second circuit configured to filter the second base signal from the electrical output signal using correlation techniques.

In the another embodiment of the receiver, the signal processing circuit may include a first circuit configured to filter the first base signal from the electrical output signal using a matched filter, and a second circuit configured to filter the second base signal from the electrical output signal using a matched filter.

In the another embodiment of the receiver, the first modulated polarized signal has a first polarization state and the second modulated polarized signal has a second polarization state at the same wavelength, wherein the second polarization state is orthogonal to the first polarization state.

In the another embodiment of the receiver, the single photodetector is polarization insensitive such that the electrical output signal includes components from a plurality of polarization states of the optical input signal.

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof.

Figure 1:
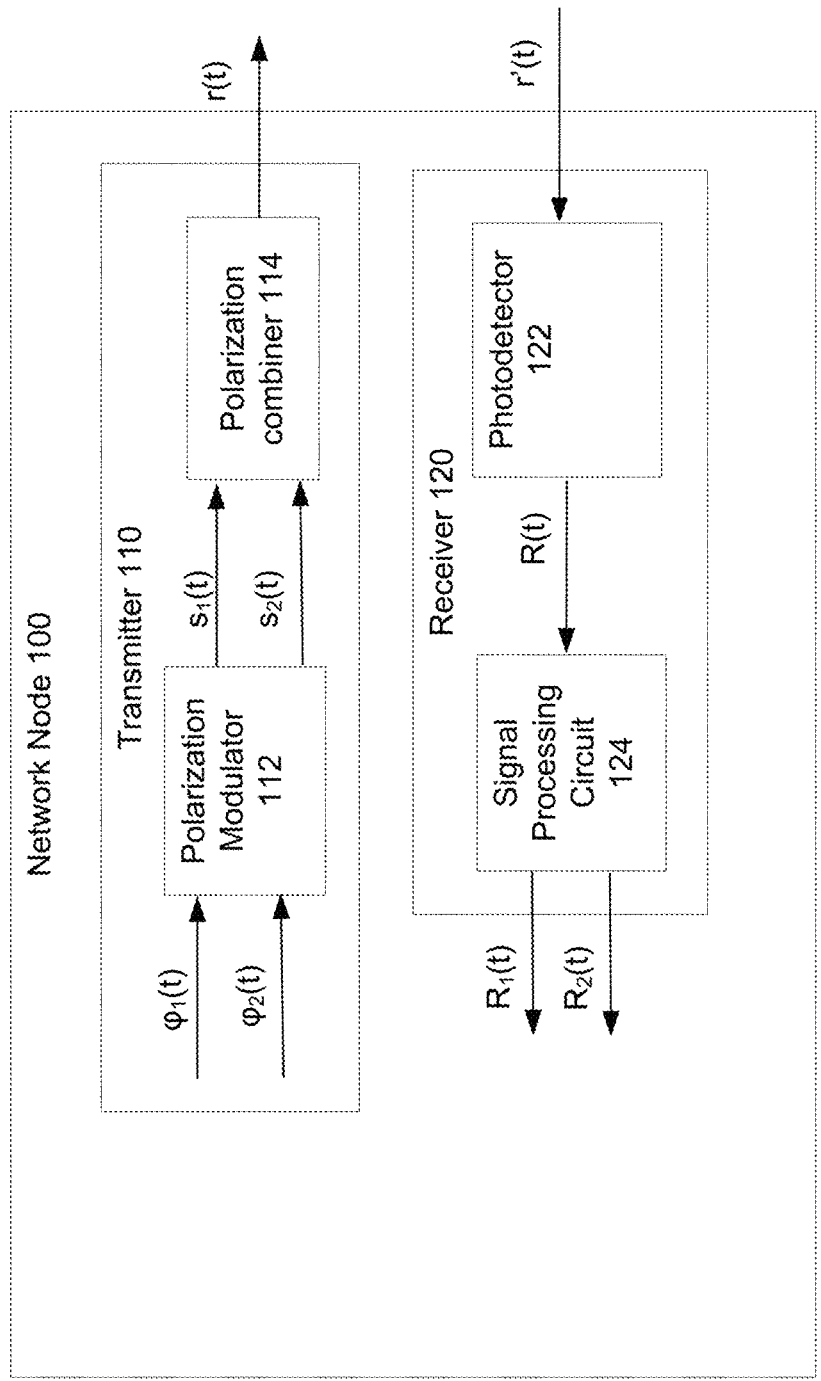
FIG. 1 illustrates a schematic block diagram of an embodiment of a network node including polarization division multiplexing with direct detection.

FIG. 1 illustrates a schematic block diagram of an embodiment of a network node 100 including polarization division multiplexing with direct detection. The network node 100 includes a transmitter 110 and receiver 120 configured for polarization division multiplexing (PDM). In an embodiment, the transmitter 110 employs multiplexing of two modulated, orthogonally polarized signals $s_1(t)$ and $s_2(t)$ at a same optical wavelength.

The transmitter 110 includes a polarization modulator 112 configured to independently modulate orthogonally polarized base signals $\varphi_1(t)$ and $\varphi_2(t)$. For example, the first base signal $\varphi_1(t)$ has a first polarization state at a wavelength while the second base signal $\varphi_2(t)$ has a second polarization state at the same wavelength, wherein the second polarization state is orthogonal to the first polarization state.

The polarization modulator 112 independently modulates the first base signal $\varphi_1(t)$ from the modulation of the second polarization signal $\varphi_2(t)$. In one embodiment, the polarization modulator 112 performs intensity modulation on the first and second base signals $\varphi_1(t)$ and $\varphi_2(t)$). Intensity modulation formats such as binary level or on-off keying (OOK) may be implemented. In another embodiment, multiple level pulse amplitude modulation (e.g., PAM-4/PAM-8) may be used to increase spectral efficiency. The polarization modulator 112 outputs modulated, polarized signals $s_1(t)$ and $s_2(t)$.

The transmitter 110 combines the two modulated, polarized signals $s_1(t)$ and $s_2(t)$ to generate a multiplexed output signal r(t). For example, the output signal r(t) may be represented as:

$$r(t)=s_1(t)+s_2(t)$$

The output signal r(t) is thus a polarization multiplexed signal generated from the intensity modulated, orthogonally polarized signals $s_1(t)$ and $s_2(t)$. The transmitter 110 transmits the output signal r(t) in an optical channel over an optical fiber or free space or other medium to another network node. The output signal r(t) thus includes two independently modulated optical signals that are transmitted on orthogonal polarization states at the same optical wavelength. Though multiplexing of two modulated, polarized signals $s_1(t)$ and $s_2(t)$ is described herein, higher order polarization multiplexing may be implemented as well. For example, three or more modulated, polarized signals with orthogonal polarization states at a wavelength may be generated and transmitted by the network node 100.

The receiver 120 of the network node 100 receives an input signal r'(t) over the optical fiber. The receiver includes a photodetector 122 configured for detecting the input signal r'(t) and generating an electrical output signal R(t) for signal processing by the signal processing circuit 124. The photodetector 122 is preferably polarization insensitive, e.g. the photodetector 122 does not filter any particular polarization. For example, the receiver 120 preferably does not include a polarization-sensitive waveguide or filter positioned before the photodetector 122. The photodetector output signal R(t) thus includes components from each of the modulated polarized signals s1(t) and s2(t).

The signal processing circuit 124 implements polarization de-multiplexing of the electrical output signal R(t) to distinguish between the modulated, polarized signals s1(t) and s2(t). For example, the signal processing circuit 124 implements one or more of matched filters, correlation techniques or another approach for de-multiplexing the electrical output signal R(t) into two de-multiplexed signals $R_1(t)$ and $R_2(t)$.

The signal processing circuit 124 outputs the two de-multiplexed signals $R_1(t)$ and $R_2(t)$.

By using signal processing of the electrical signal R(t) at the receiver 120, it is possible to detect the input signal r'(t) using a single photodetector 122 and recover the data signals $d_1$ and $d_2$. The receiver 120 thus employs direct detection of the input signal r'(t) to recover the data signals $d_1$ and $d_2$ using a single photodetector 122 and signal processing circuit 124. Since the receiver 120 only needs a single photodetector 122 to detect the input signal r'(t), the network node 100 reduces optical loss, cost and complexity.

Figure 2:
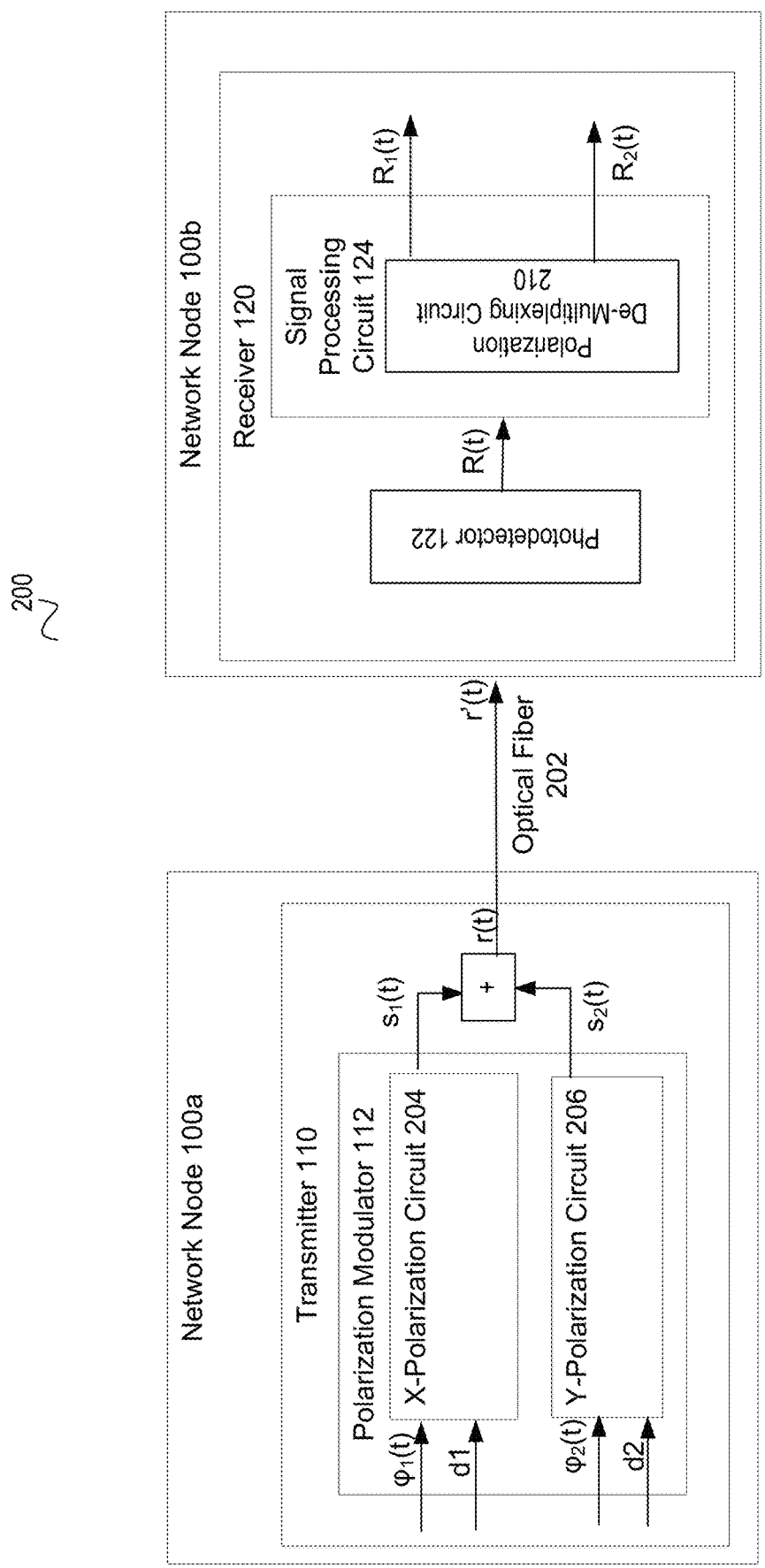
FIG. 2 illustrates a schematic block diagram of an embodiment of an exemplary optical communications system including polarization division multiplexing with direct detection.

FIG. 2 illustrates a schematic block diagram of an embodiment of an exemplary optical communications system 200 including polarization division multiplexing with direct detection. The optical communications system 200 is illustratively shown comprising a transmitter 110 in a first network node 100a and a receiver 120 in a second network node 100b coupled by an optical fiber 202. Although the transmitter 110 and the receiver 120 are shown in separate network nodes, the transmitter 110 or receiver 110 may each be employed separately, or in combination with each other in a same network node.

A set of orthogonal polarization base signals $\varphi_1(t)$ and $\varphi_2(t)$ are used to carry information of a first data signal $d_1$ and a second data signal $d_2$. In the example herein, the base signals $\varphi_1(t)$ and $\varphi_2(t)$ are illustrated as sine and cosine pulses:

$$\varphi_1(t) = \sin\left(2\pi\frac{t}{2t}\right)$$

$$\varphi_2(t) = \cos\left(2\pi\frac{t}{2T}\right)$$

wherein T is the symbol period of the data signals $d_1$ and $d_2$. Though sine and cosine pulses are illustrated, the base signals $\varphi_1(t)$ and $\varphi_2(t)$ may include any two orthogonal polarization states at a single optical frequency.

Assuming the first data signal $d_1$ and the second data signal $d_2$ are real-valued binary data signals represented with −1 for a logical '0' and 1 for a logical '1', then:

$$s_1(t) = d_1 \cdot \varphi_1(t) = d_1 \cdot \sin\left(2\pi\frac{t}{2T}\right), d_1 \in \{-1, 1\}$$

$$s_2(t) = d_2 \cdot \varphi_2(t) = d_2 \cdot \cos\left(2\pi\frac{t}{2T}\right), d_2 \in \{-1, 1\}.$$

The modulation using the first data signal $d_1$ is independent from the modulation using the second data signal $d_2$. For example, the first data signal $d_1$ may be a different data signal with no dependence or relation to the second data signal $d_2$. The intensity modulation of the first data signal $d_1$ is performed on the first base signal $\varphi_1(t)$ independently and without reference to modulation of the second data signal $d_2$ on the second base signal $\varphi_2(t)$. Similarly, the intensity modulation of the second data signal $d_2$ is performed on the second base signal $\varphi_2(t)$ independently and without reference to modulation of the first data signal $d_1$ on the first base signal $\varphi_1(t)$. The first modulated polarized signal $s_1(t)$ has a first first polarization state at a first wavelength while the second polarization optical signal $s_2(t)$ has a second polarization state at the same first wavelength.

In one embodiment, to perform independent modulation, separate modulators may be implemented. For example, the X-Polarization circuit 204 is configured to modulate the first base signal $\varphi_1(t)$ with the first data signal $d_1$ and the Y-Polarization Circuit 206 is configured to modulate the second base signals $\varphi_2(t)$ with the second data signal $d_2$. Although x- and y-polarizations are illustratively shown, other orthogonal polarization states or additional orthogonal polarization states of the wavelength may be employed in accordance with the present principles. In addition, other methods may be implemented for independently modulating the orthogonally polarized base signals $\varphi_1(t)$ and $\varphi_2(t)$.

The subcarrier of the base signals $\varphi_1(t)$ and $\varphi_2(t)$ is centered at half the baud rate of the first data signal $d_1$ and the second data signal $d_2$. As such, the modulated polarized signals $s_1(t)$ and $s_2(t)$ may be raised cosine filtered to avoid excess bandwidth and aliasing, but this filtering is not depicted in the example equations herein for ease of explanation.

Figure 3:
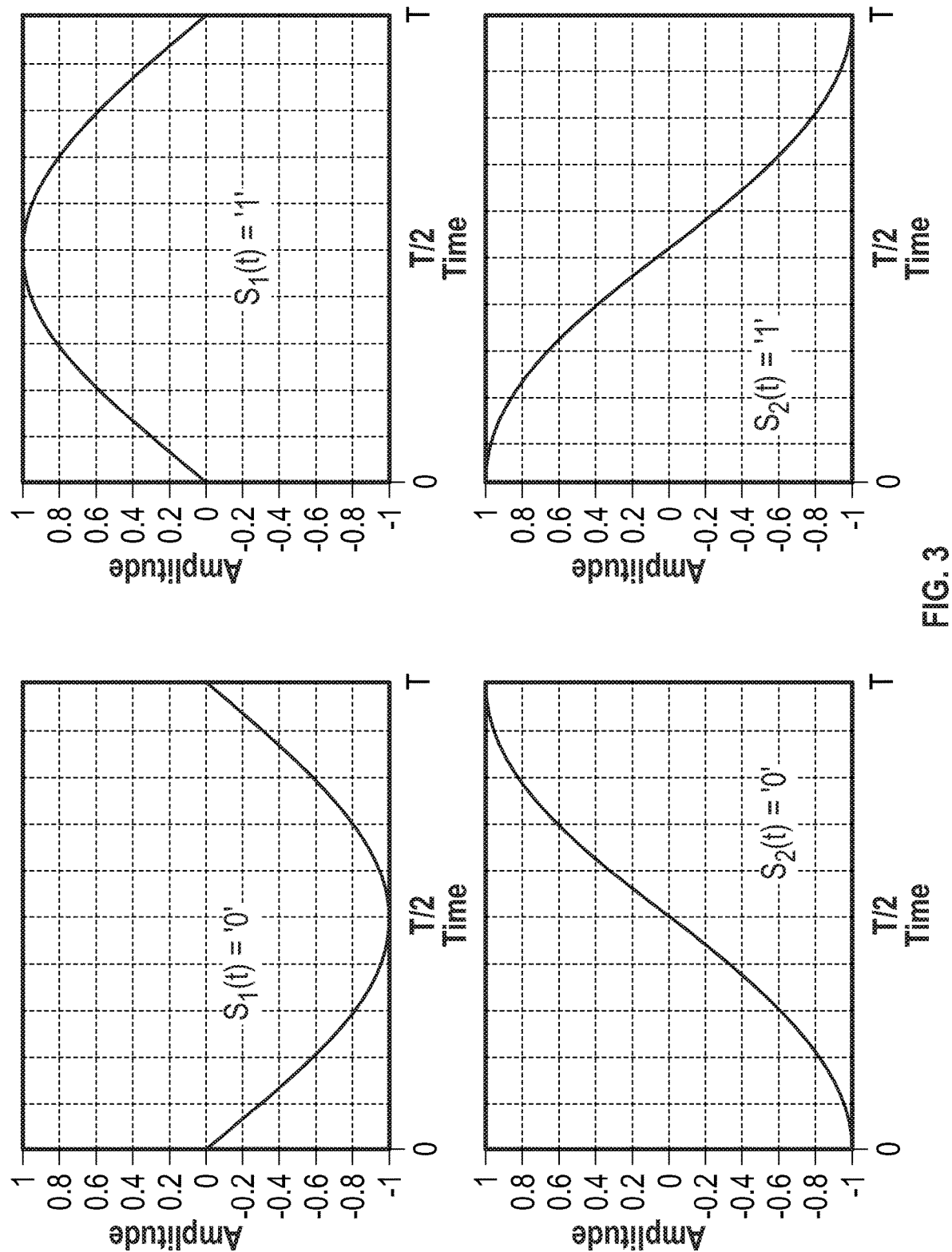
FIG. 3 illustrates graphically an embodiment of time-domain waveforms for the dual orthogonal polarization signals.

FIG. 3 illustrates graphically an embodiment of time-domain waveforms for the dual modulated polarized signals $s_1(t)$ and $s_2(t)$. In this embodiment, the orthogonal polarization $s_1(t)$ and $s_2(t)$ are modulated with sine and cosine pulses and with binary data signals $d_1$ and $d_2$. In other embodiments, the data signals $d_1$ and $d_2$ are not so limited. For example, intensity modulation formats such as multiple level pulse amplitude modulation (PAM-4/PAM-8) may be used to increase spectral efficiency. Such PAM schemes also only require a single photodetector 122 in the receiver 120, as described in more detail herein.

Figure 4:
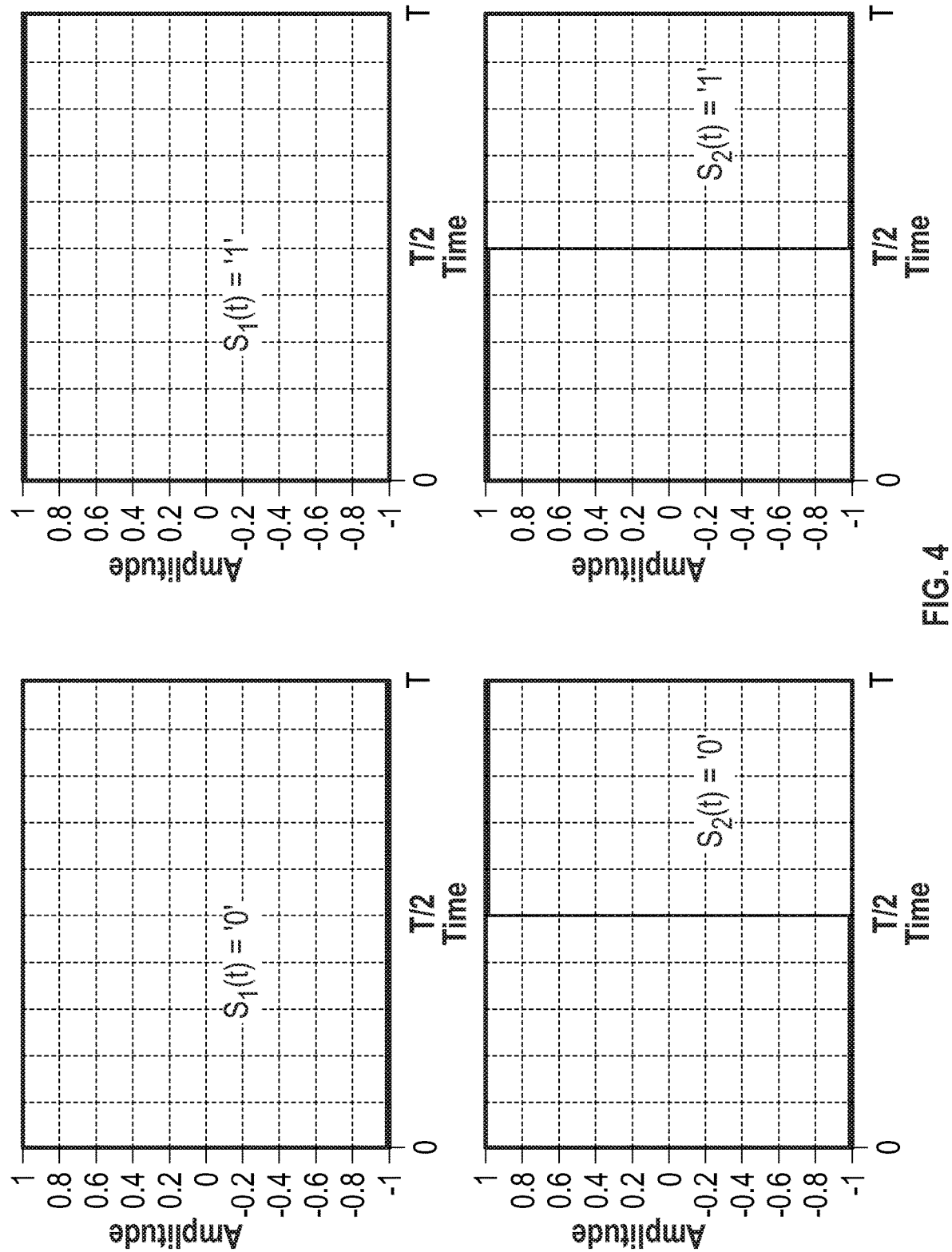
FIG. 4 illustrates graphically another embodiment of time-domain waveforms for the dual orthogonal polarization signals.

FIG. 4 illustrates graphically another embodiment of time-domain waveforms for the modulated polarized signals $s_1(t)$ and $s_2(t)$. The graphs illustrate another example of modulated polarized signals $s_1(t)$ and $s_2(t)$ that are modulated with binary data signals $d_1$ and $d_2$. In this example, the modulated polarized signals $s_1(t)$ and $s_2(t)$ are generated by modulating base signals $\varphi_1(t)$ and $\varphi_2(t)$ with data signals $d_1$ and $d_2$ having a symbol period T. The implementations herein are not limited to the two orthogonal base signals $\varphi_1(t)$ and $\varphi_2(t)$. Other sets of two or more orthogonal base signals may be implemented additionally or alternatively thereto.

Referring back to FIG. 2, the transmitter 110 combines the modulated polarized signals $s_1(t)$ and $s_2(t)$ to generate the output signal r(t), wherein the output signal r(t) may be represented as:

$$r(t) = s_1(t) + s_2(t)$$

At the receiver 120, assuming that there is negligible polarization mode dispersion and polarization mixing, the photodetector 122 detects the received polarization-multiplexed input signal r'(t). The photodetector 122 generates the electrical output signal R(t), which may be expressed as:

$$R(t) = |E_{x\_pol}(t)|^2 + |E_{y\_pol}(t)|^2 = 1 + s_1(t) + 1 + s_2(t)$$

Since the photodetector 122 is not polarization sensitive, both polarizations $E_{x\_pol}(t)$ and $E_{y\_pol}(t)$ may randomly rotate through the optical fiber. The signals will remain orthogonal and be detected as $|E_{x\_pol}(t)|^2 + |E_{y\_pol}(t)|^2$ by the photodetector 122.

The polarization de-multiplexing circuit 210 receives the electrical signal R(t) generated by the photodetector 122. The photodetector 122 or the polarization de-multiplexing circuit 210 may perform DC filtering or AC-coupling, and then the electrical output signal R(t) may be expressed as:

$$R(t) = s_1(t) + s_2(t) = d_1 \cdot \sin\left(2\pi \frac{t}{2T}\right) + d_2 \cdot \cos\left(2\pi \frac{t}{2T}\right).$$

The polarization de-multiplexing circuit 210 may be implemented by using either a matched filter or a correlator configured to remove or filter the orthogonal base signals $\varphi_1(t)$ and $\varphi_2(t)$. For example, in the case of a correlator approach, the receiver 122 may include two correlators that filter the orthogonal base signals $\varphi_1(t)$ and $\varphi_2(t)$, yielding respectively the de-multiplexed signals $R_1(t)$ and $R_2(t)$:

$$\begin{aligned} R_1(t) &= \int_0^T R(t) \cdot \varphi_1(t) dt \\ &= \int_0^T \left[d_1 \cdot \sin\left(2\pi \frac{t}{2T}\right) + d_2 \cdot \cos\left(2\pi \frac{t}{2T}\right)\right] \cdot \sin\left(2\pi \frac{t}{2T}\right) dt \\ &= \int_0^T \left[d_1 \cdot \sin\left(2\pi \frac{t}{2T}\right)^2 + d_2 \cdot \frac{1}{2} \sin\left(2\pi \frac{t}{T}\right)\right] dt \\ &= \int_0^T d_1 \cdot \sin\left(2\pi \frac{t}{2T}\right)^2 dt \\ &= \frac{T}{2} d_1 \end{aligned}$$

$$\begin{aligned} R_2(t) &= \int_0^T R(t) \cdot \varphi_2(t) dt \\ &= \int_0^T \left[d_1 \cdot \sin\left(2\pi \frac{t}{2T}\right) + d_2 \cdot \cos\left(2\pi \frac{t}{2T}\right)\right] \cdot \cos\left(2\pi \frac{t}{2T}\right) dt \\ &= \int_0^T \left[d_1 \cdot \frac{1}{2} \sin\left(2\pi \frac{t}{T}\right) + d_2 \cdot \cos\left(2\pi \frac{t}{2T}\right)^2\right] dt \\ &= \int_0^T d_2 \cdot \cos\left(2\pi \frac{t}{2T}\right)^2 dt \\ &= \frac{T}{2} d_2 \end{aligned}$$

The first de-multiplexed signal $R_1(t)$ may be used to recover the data signal $d_1$, and the second de-multiplexed signal $R_2(t)$ may be used to recover the data signal $d_2$. The recovery of the data signals $d_1$ and $d_2$ by the receiver 120 thus only requires a single photodetector 122. Since the receiver 120 needs only a single photodetector 122 to recover the data signals $d_1$ and $d_2$, the receiver 120 reduces optical loss, cost and complexity.

Embodiments of the Transmitter

Figure 5A:
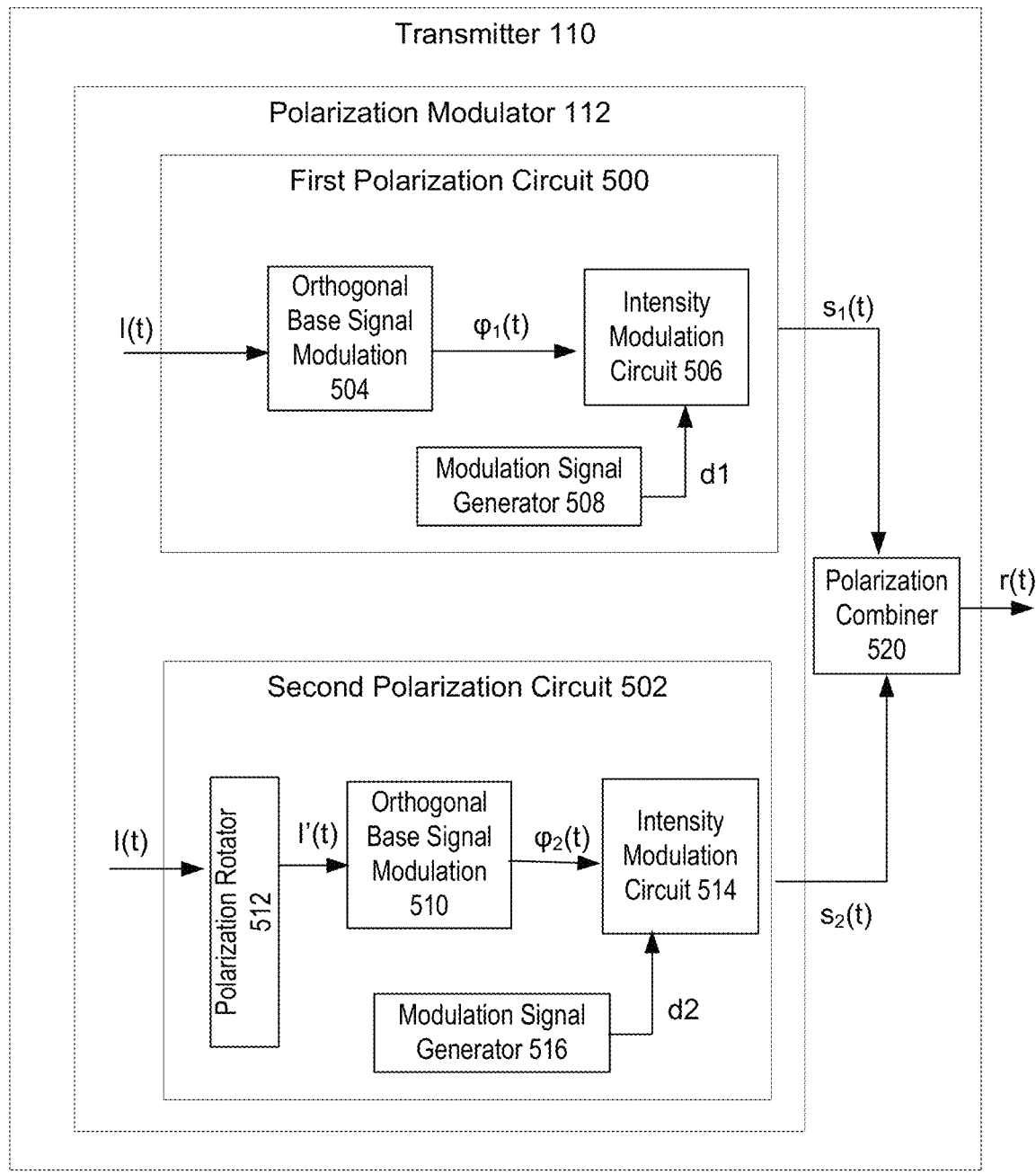
FIG. 5A illustrates a schematic block diagram of an embodiment of a transmitter including polarization division multiplexing with intensity modulation in more detail.

FIG. 5A illustrates a schematic block diagram of an embodiment of a transmitter 110 configured to perform polarization division multiplexing (PDM) with intensity modulation in more detail. The transmitter 110 includes the polarization modulator 112 configured to generate the modulated polarized signals $s_1(t)$ and $s_2(t)$ for transmission over a single wavelength channel. In this embodiment, separate modulation circuits, first modulation circuit 500 and second modulation circuit 502 are implemented, to modulate the orthogonally polarized base signals $\varphi_1(t)$ and $\varphi_2(t)$. The first modulation circuit 500 modulates the first base signal $\varphi_1(t)$ to generate the first modulated polarized signal $s_1(t)$ and the second modulation circuit 502 modulates the second base signal $\varphi_2(t)$ to generate the second modulated polarized signal $s_2(t)$, wherein the second modulated polarized signal $s_2(t)$ has a polarization state that is orthogonal to the first modulated polarized signal $s_1(t)$.

The first polarization circuit 500 includes an orthogonal base signal modulation circuit 504 that optically filters and/or modulates a first optical input signal I(t) at a wavelength to generate the first base signal $\varphi_1(t)$. An intensity modulation circuit 506 modulates the first base signal $\varphi_1(t)$ with data signal $d_1$ to generate the first modulated polarized signal $s_1(t)$.

The data signal $d_1$ may be generated by modulation signal generator 508 and include encoding, forward error correction (FEC) or other information. The first polarization circuit 500 outputs the first modulated polarized signal $s_1(t)$ having intensity modulation, wherein $s_1(t)$ may be represented as:

$$s_1(t) = d_1 \cdot \varphi_1(t) = d_1 \cdot \sin\left(2\pi \frac{t}{2T}\right)$$

wherein T=the symbol period.

In another embodiment, the modulation circuits 504 and 506 may be combined. In another embodiment, the first optical input signal I(t) may be modulated by a combined modulation signal of the first orthogonal base signal $\varphi_1(t)$ and the first data signal $d_1$.

The second polarization circuit 502 includes a polarization rotator 512 that rotates or filters the first optical input signal I(t) at the same wavelength to generate a second optical input signal I'(t) having a second polarization state of the same wavelength that is orthogonal to the first polarization state. The second polarization circuit 502 also includes an orthogonal base signal modulation circuit 510 that receives the second optical input signal I' (t). The orthogonal base signal modulation circuit 510 modulates or filters the second optical input signal I'(t) to generate a second orthogonal base signal $\varphi_2(t)$ having the second orthogonal polarization state at the wavelength.

An intensity modulation circuit 514 modulates the second orthogonal base signal $\varphi_2(t)$ with data signal $d_2$. The data signal $d_2$ may be generated by modulation signal generator 516 and include encoding, forward error correction (FEC) or other information, as well. The second polarization circuit 502 outputs the second polarization signal $s_2(t)$ including intensity modulation, wherein $s_2(t)$ may be represented as:

$$s_2(t) = d_2 \cdot \varphi_2(t) = d_2 \cdot \cos\left(2\pi \frac{t}{2T}\right)$$

wherein T=the symbol period.

In another embodiment, the modulation circuits 514 and 516 may be combined. In another embodiment, the second optical input signal I'(t) having a second polarization state of the wavelength is modulated by a combined modulation signal of the second orthogonal base signal $\varphi_2(t)$ and the second data signal $d_2$.

The polarization combiner 520 multiplexes or combines the intensity modulated, polarized signals s1(*t*) and s2(*t*) to generate the output signal r(t). The polarization combiner is configured to combine the first modulated polarized signal s1(*t*) and the second modulated polarized signal s2(*t*), such that when combined, the first polarization state of the first optical signal s1(*t*) is orthogonal to the second polarization state of the second optical signal s2(*t*). The transmitter 110 transmits the output signal r(t), e.g. over an optical fiber or optical free space.

Figure 5B:
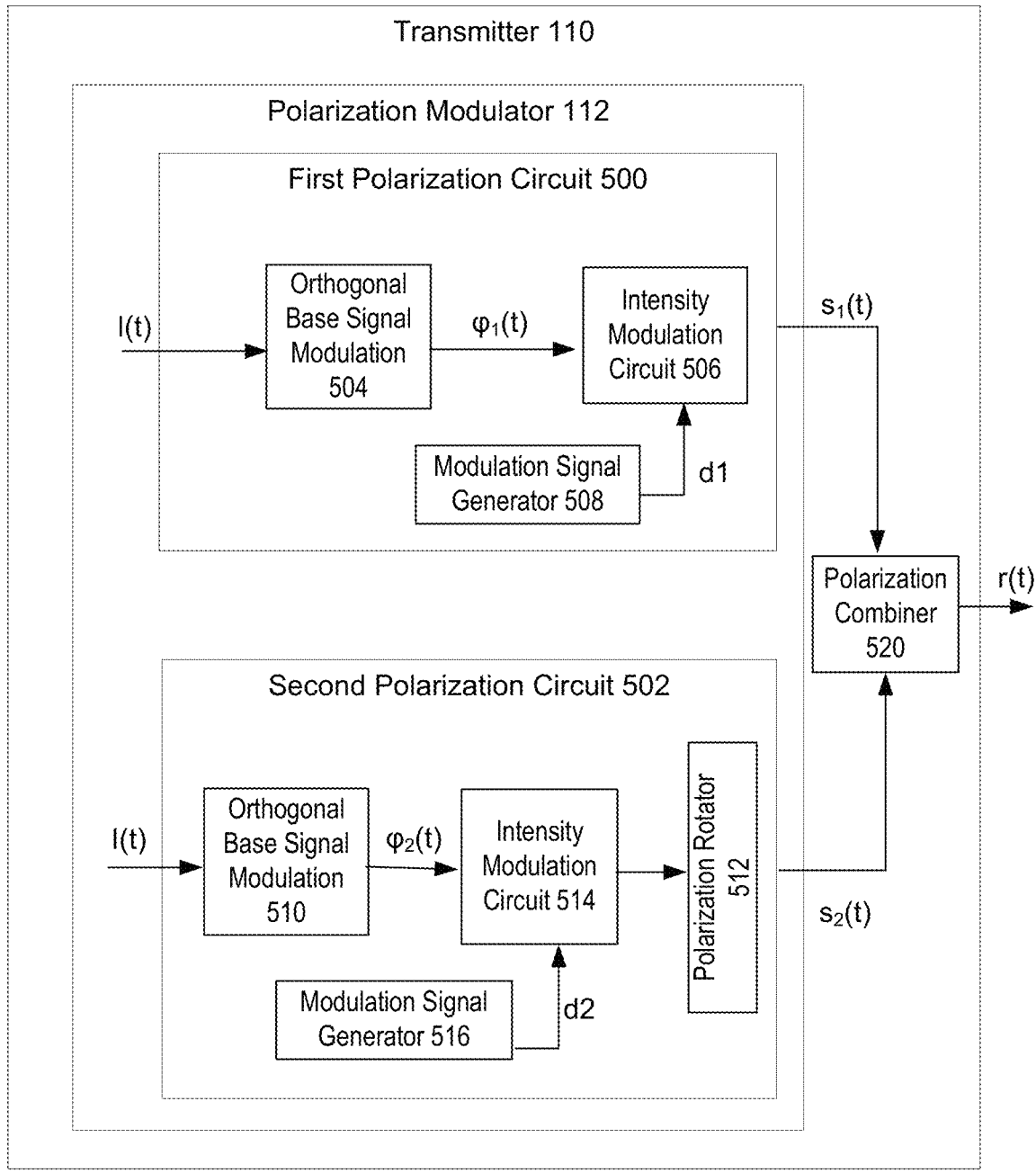
FIG. 5B illustrates a schematic block diagram of another embodiment of a transmitter including polarization division multiplexing with intensity modulation in more detail.

FIG. 5B illustrates a schematic block diagram of another embodiment of a transmitter 110 including polarization division multiplexing with intensity modulation in more detail. In this embodiment, in the second polarization circuit 502, the polarization rotator 512 is implemented after the modulation of the base signal $\varphi_2(t)$. For example, orthogonal base signal modulation circuit 510 modulates the second base signal $\varphi_2(t)$ and intensity modulation circuit 514 modulates the second base signal $\varphi_2(t)$ with data signal $d_2$. The polarization rotator 512 then rotates the modulated base signal $\varphi_2(t)$ to generate the modulated polarized signal $s_2(t)$ having a second polarization state of the wavelength. A polarization combiner 520 is configured to combine the first modulated optical signal $s_1(t)$ and the second modulated optical signal $s_2(t)$, such that when combined, the first polarization state of the first modulated optical signal $s_1(t)$ is orthogonal to the second polarization state of the second modulated optical signal $s_2(t)$.

QAM is a type of modulation and is different than intensity modulating different polarization states of an optical signal described herein. In the case of quadrature amplitude modulation (QAM), the amplitude of two signals of the same frequency but 90° out-of-phase with each other (in quadrature) are amplitude modulated to generate the data signal d1 or d2. A QAM data signal thus includes two signals at a same frequency with orthogonal phases (e.g., 90° out-of-phase) or a single single with both amplitude and phase modulation.

By convention, the "polarization" state of electromagnetic waves refers to the direction of the electric field. The polarization state of an optical signal thus specifies the geometrical orientation of the oscillations of transverse waves of the electrical filed. In embodiments herein, the two base signals $\varphi\_1$ (*t*) and $\varphi\_2$ (*t*) with orthogonal polarizations, e.g. x- and y-polarizations, have geometrical orientations of the oscillations of transverse waves that are orthogonal. These orthogonal polarization states at a wavelength, e.g. two optical signals with orthogonal geometrical orientations of the oscillations of transverse waves, are independently modulated. In contrast, in QAM, there is no predetermined difference as to the geometrical orientation of the oscillations of transverse waves. In addition, the first polarized optical signal $s_1(t)$ thus has an indeterminate phase with respect to the second polarized signal $s_2(t)$.

Embodiment of the Receiver

Figure 6:
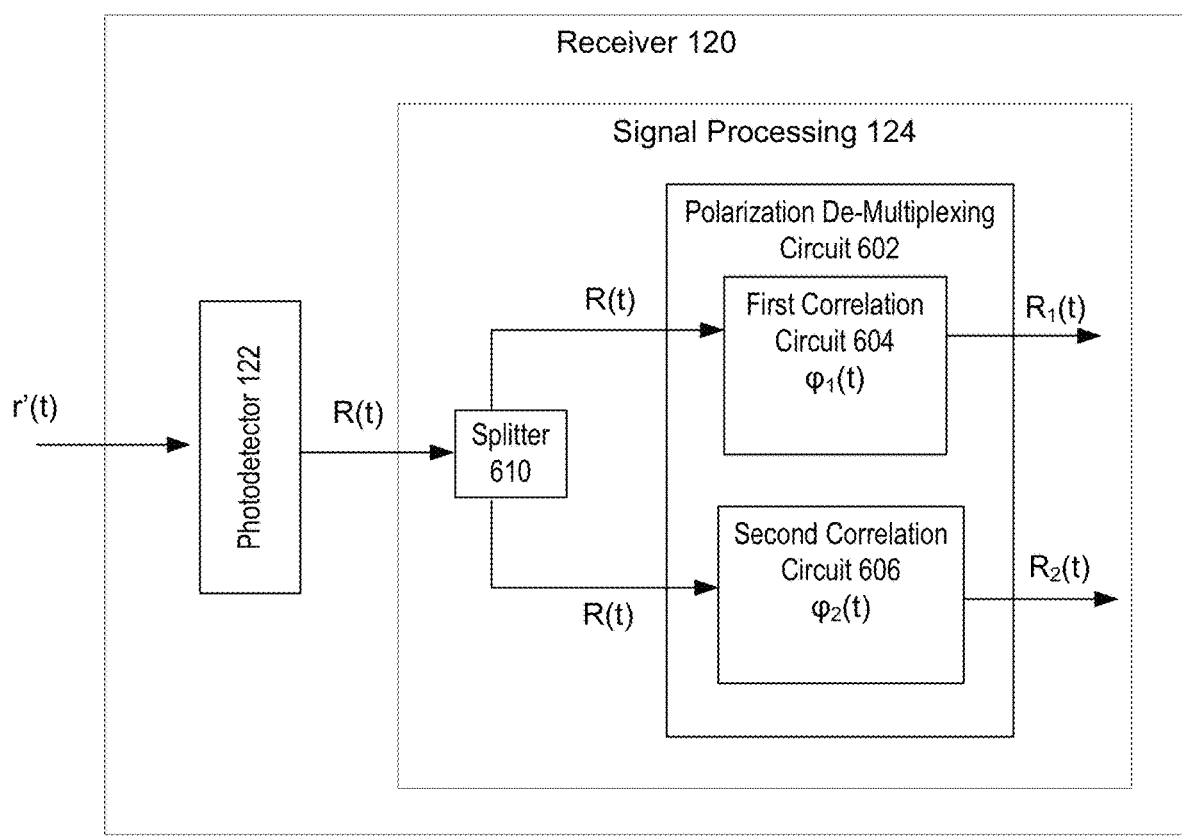
FIG. 6 illustrates a schematic block diagram of an embodiment of a receiver including direct detection of dual orthogonal polarizations using a single photodetector in more detail.

FIG. 6 illustrates a schematic block diagram of an embodiment of the receiver 120 including direct detection of dual modulated polarized signals $s_1(t)$ and $s_2(t)$ using a single photodetector 122 in more detail. The receiver 120 of network node 100 receives the input signal r'(t) over an optical fiber or optical free space.

The photodetector 122 is configured to detect a plurality of polarizations of the input signal r'(t) to generate the electrical output signal R(t). The photodetector 122 is preferably not polarization sensitive. In addition, the receiver 120 preferably does not include a polarization-sensitive waveguide or filter positioned before the photodetector 122. The photodetector output signal R(t) thus includes components from both of the orthogonally polarized signals $s_1(t)$ and $s_2(t)$.

The signal processing circuit 124 implements polarization de-multiplexing of the electrical output signal R(t) to distinguish between the modulated polarized signals $s_1(t)$ and $s_2(t)$. A splitter 610 splits the electrical signal R(t) into at least two components for input to the polarization de-multiplexing circuit 602.

In an embodiment herein, the polarization de-multiplexing circuit 602 implements correlation techniques. For example, the polarization de-multiplexing circuit 602 includes a first correlation circuit 604 that correlates the signal R(t) with the first base signal $\varphi_1(t)$ to generate the first de-multiplexed signal $R_1(t)$, wherein $R_1(t)$ may be expressed as:

$$R_1(t) = \int_0^T R(t) \cdot \varphi_1(t) dt = \frac{T}{2} d_1$$

The receiver 120 may then obtain the data signal $d_1$ from the first de-multiplexed signal $R_1(t)$. Other approaches for de-multiplexing the orthogonal polarizations $s_1(t)$ and $s_2(t)$ may also be employed by the receiver 120. By using signal processing of the electrical output signal R(t) at the receiver 120, it is possible to distinguish between the modulated polarized signals s1(t) and s2(t) using direct detection.

A second correlation circuit 606 also receives the output signal R(t) from the splitter 610. The splitter 610 thus inputs the output signal R(t) to both the first correlation circuit 604 and the second correlation circuit 606. The second correlation circuit 606 correlates the output signal R(t) with the second base orthogonal signal $\varphi_2(t)$ to generate the second de-multiplexed signal $R_2(t)$, wherein $R_2(t)$ may be expressed as:

$$R_2(t) = \int_0^T R(t) \cdot \varphi_2(t) dt = \frac{T}{2} d_2$$

The receiver 120 may then obtain the data signal $d_2$ from the second de-multiplexed signal $R_2(t)$. The correlation techniques in the signal processing circuit 124 thus distinguish the second data signal $d_2$ from the photodetector output signal R(t).

The signal processing circuit 124 thus outputs two de-multiplexed signals $R_1(t)$ and $R_2(t)$, from which the data signals $d_1$ and $d_2$ may be obtained. Since the receiver 120 includes only a single photodetector 122, the network node 100 reduces optical loss, cost and complexity. Although x- and y-polarizations are illustratively shown, it is contemplated that other orthogonal polarizations may be employed in accordance with the present principles.

Figure 7:
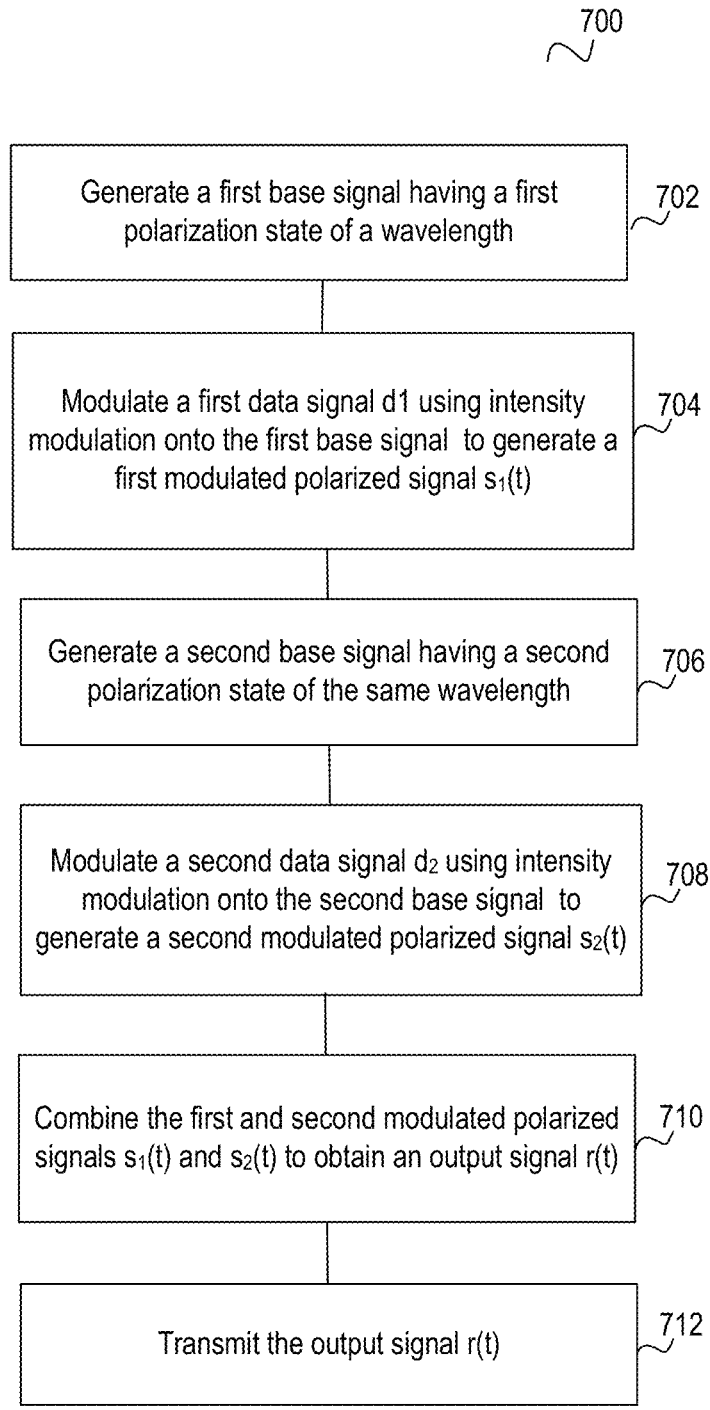
FIG. 7 illustrates a logical flow diagram of an embodiment of a method for polarization division multiplexing with intensity modulation.

FIG. 7 illustrates a logical flow diagram of an embodiment of a method 700 for polarization division multiplexing with intensity modulation. A first orthogonal base signal is generated having a first polarization state at a wavelength at step 702. A first data signal $d_1$ is modulated using intensity modulation onto the first base signal to generate a first modulated polarized signal $s_1(t)$ at step 704.

A second base signal is generated having a second polarization state at the same wavelength at step 706. The second polarization state is orthogonal to the first polarization state of the wavelength. As such, the second base signal has a polarization state that is orthogonal to the polarization state of the first base signal. A second data signal $d_2$ is modulated using intensity modulation onto the second base signal to generate a second modulated polarized signal $s_2(t)$ at step 708.

The first modulated polarized signal $s_1(t)$ and the second modulated polarized signal $s_2(t)$ are combined to obtain an output signal r(t) at step 710. The output signal r(t) is transmitted over an optical fiber or optical free space at step 712.

Figure 8:
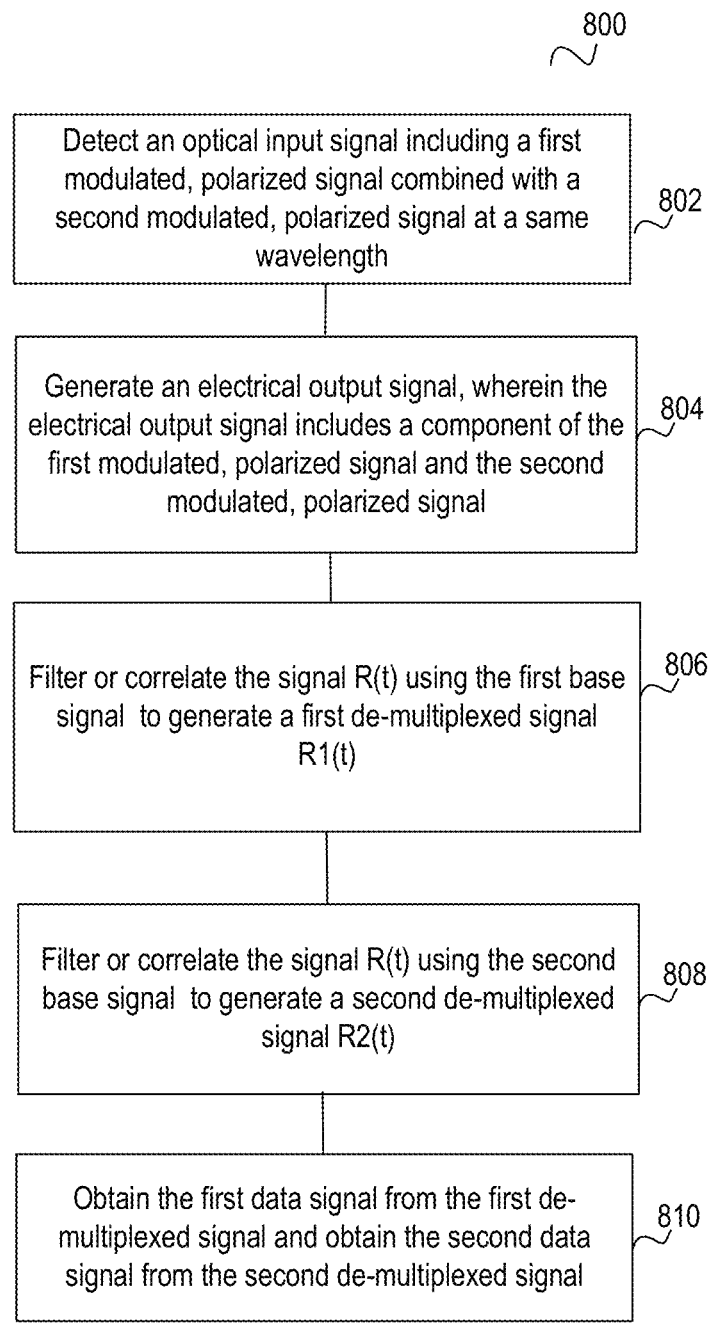
FIG. 8 illustrates a logical flow diagram of an embodiment of a method for direct detection of dual orthogonal polarizations using a single photodetector.

FIG. 8 illustrates a logical flow diagram of an embodiment of a method 800 for direct detection of multiplexed, orthogonally polarized signals using a single photodetector. An optical input signal is detected, wherein the optical input signal includes a first modulated, polarized signal combined with a second modulated, polarized signal at a same wavelength at step 802. The first modulated, polarized signal is modulated with a first data signal $d_1$, and the second modulated, polarized signal is independently modulated with a second data signal $d_2$.

An electrical output signal R(t) is generated by the single photodetector at step 804. Since the single photodetector is polarization insensitive, the electrical output signal R(t) includes a plurality of polarization states, including components of the first modulated, polarized signal and the second modulated, polarized signal.

Using a matched filter or correlator during signal processing of the electrical output signal R(t), the first base signal is filtered from the signal R(t) to generate a first de-multiplexed signal $R_1(t)$ at step 806. For example, the first base signal is filtered from the output signal R(t) using correlation techniques or matched filters.

Similarly, using a matched filter or correlator during signal processing of the electrical output signal R(t), the second base signal is filtered from the signal R(t) to generate a second de-multiplexed signal $R_2(t)$ at step 808. For example, the second base signal is filtered from the output signal R(t) using correlation techniques or matched filters.

The first data signal d1 may then be obtained from the first de-multiplexed signal, and the second data signal obtained from the second de-multiplexed signal at 810. Since the receiver 120 includes only a single photodetector 122, the network node 100 reduces optical loss, cost and complexity.

In one or more embodiments described herein, a transmitter modulates a first polarization signal at a wavelength with a first data signal using intensity modulation. The transmitter modulates a second polarization signal at the same wavelength with a second data signal using intensity modulation. The transmitter combines the modulated, polarization signals and generates an output signal. A receiver includes a photodetector that receives the output signal and generates an electrical output signal including components of both modulated, polarization signals. A signal processing circuit implements correlation techniques or matching filters to recover the first and second data signal from the electrical output signal.

A processing device as described herein includes at least one processing device, such as a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory device may be a single memory device or a plurality of memory devices. The memory device may be one or more of a read-only memory, random access memory, volatile memory, non-volatile memory, static memory, dynamic memory, flash memory, cache memory, and/or any non-transitory memory device that stores digital information.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a method that are depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. One or more steps of the method or process may be combined or equivalent steps performed. A process may correspond to a method, a function, a procedure, a subroutine, a subprogram, etc.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art. The specification and figures are illustrative, rather than restrictive, and modifications are intended to be included within the scope of the claims. The components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components, in addition to those not specifically recited, may be varied or otherwise particularly adapted to specific environments, manufacturing specifications, design parameters, or other operating requirements without departing from the general principles of the same.

Moreover, reference to an element in the singular using "a" or "an" is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. An apparatus comprising an optical receiver, the optical receiver comprising:
   a photodetector configured to output a single electrical signal by direct detection of an optical input signal received in the optical receiver; and
   an electrical processor circuit connected to produce from the single electrical signal first data signals and second data signals in response to the optical input signal including a first polarized signal modulated with the first data signals and a second polarized signal modulated with the second data signals; and
   wherein the first and second polarized signals are in a same wavelength channel and are independently modulated with data.

2. The apparatus of claim 1, wherein the electrical processor circuit comprises:
   an electrical splitter configured to split the single electrical signal into first and second portions; and
   a first correlation circuit configured to filter the first portion of the single electrical signal using a first base signal to generate the first data signal.

3. The apparatus of claim 2, wherein the electrical processor circuit comprises a second correlation circuit configured to filter the second portion of the single electrical signal using a second base signal to generate the second data signal.

4. The apparatus of claim 1, wherein the photodetector is polarization insensitive such that the single electrical signal includes components from a plurality of polarization states of the optical input signal.

5. An apparatus comprising an optical receiver, the optical receiver comprising:
   a photodetector configured to output a single electrical signal by direct detection of an optical input signal received in the optical receiver; and
   an electrical processor circuit that comprises:
      a first circuit connected to filter the single electrical signal using correlation techniques and a first base signal to obtain first data signals in response to the optical input signal including a first polarized signal modulated with the first data signals; and
      a second circuit connected to filter the single electrical signal using correlation techniques and a second base signal to obtain second data signals in response to the optical input signal including a second polarized signal modulated with the second data signals; and
      wherein the first and second polarized signals are in a same wavelength channel and are independently modulated with data.

6. The apparatus of claim 5, wherein, in the optical input signal, a polarization state of the first polarized signal is orthogonal to a polarization state of the second polarized signal.

7. The apparatus of claim 5, wherein the photodetector is polarization insensitive such that the single electrical signal includes components from a plurality of polarization states of the optical input signal.

8. The apparatus of claim 1, wherein the electrical processor circuit comprises first and second matched filters for recovering the first data signals and the second data signals based on respective temporally orthogonal base signals.

* * * * *